United States Patent [19]
Wallace

[11] Patent Number: 5,407,305
[45] Date of Patent: Apr. 18, 1995

[54] CONTINUOUS DENSE PHASE CONVEYING METHOD UTILIZING HIGH PRESSURE GAS AT PREDETERMINED GAS PRESSURES WITHIN A CONVEYING PIPE

[75] Inventor: Edward B. Wallace, Houston, Tex.

[73] Assignee: Semco, Inc., Houston, Tex.

[21] Appl. No.: 55,522

[22] Filed: Apr. 29, 1993

[51] Int. Cl.6 ............................................. B65G 53/66
[52] U.S. Cl. ....................................... 406/14; 406/11; 406/30; 406/65; 406/128
[58] Field of Search ....................... 406/10, 11, 12, 14, 406/15, 29, 30, 63, 64, 65, 66, 67, 68, 85, 127, 128

[56] References Cited

U.S. PATENT DOCUMENTS 4,775,267 10/1988 Yamamoto ........................ 406/12 X

FOREIGN PATENT DOCUMENTS 2-182621 7/1990 Japan ..................... 406/30

OTHER PUBLICATIONS

"Flo-Tronics-The Flo-Wave Story", Advertising Sheet; Allied Industries, Rev. May 28, 1991.

Primary Examiner—David M. Mitchell
Assistant Examiner—Andrew C. Pike
Attorney, Agent, or Firm—Kokjer, Kircher, Bowman & Johnson

[57] ABSTRACT

A continuous dense phase conveying method and apparatus, for conveying large quantities of dry bulk material through a material conveying pipe, feed particulate material into the conveying pipe and supply a quantity of low pressure gas into the pipe to force particulate material to move therealong. A gas pressure within the conveying pipe is monitored. When this monitored pressure reaches a predetermined gas pressure level, a quantity of high pressure gas is supplied to the conveying pipe to force the particulate material to move continuously therealong.

16 Claims, 3 Drawing Sheets

CONTINUOUS DENSE PHASE CONVEYING METHOD UTILIZING HIGH PRESSURE GAS AT PREDETERMINED GAS PRESSURES WITHIN A CONVEYING PIPE

BACKGROUND OF THE INVENTION

1. Field of the Invention

The invention relates to a continuous dense phase conveying method and apparatus for conveying large quantities of dry bulk materials through a material conveying pipe.

2. Description of the Prior Art

Pneumatic conveying systems are designed to move large quantities of particulate material in an air, or inert gas, medium through a material conveying pipe. The use of the term "particulate material" herein includes any material which is in a granular, powder, or pelletized form including, but not limited to, pellets formed of plastic material or other chemicals, bulk commodity grains, soap powders, and other similar bulk materials, as are known in the art. Pneumatic conveying systems are of two general types: dilute phase systems and dense phase systems. Typically, the type of particulate material to be conveyed determines what type of pneumatic conveying system to utilize.

Dilute phase conveying systems typically utilize a high volume of air, or inert gas, at a low pressure, not exceeding 15 psig, that is used to convey a low volume of particulate material. The air, or inert gas, stream travels at a high velocity, typically between 4,000 to 6500 feet per minute to keep the light particulate product load in suspension in the flowing air, or inert gas, stream. In dilute phase conveying systems, the particulate material being conveyed is usually very free flowing. A major disadvantage associated with dilute phase conveying systems is that if the particulate material being conveyed is either abrasive, or is subject to damage by the high air, or inert gas, stream velocity, dilute phase conveying systems should not be used. If the particulate material is abrasive, it can damage the material conveying pipe and related equipment, and thus cause premature failure of such equipment. With many particulate materials, product degradation caused by the high velocity air, or inert gas, stream is a significant problem, because a significant portion of the particulate material to be conveyed may be damaged while it is being conveyed. With many particulate materials, such as, for example, plastic pellets, an undesired amount of unwanted fines, or a fine powder, results from the conveyance of such materials through a dilute phase conveying system.

If the particulate material to be conveyed is either abrasive or subject to product degradation, dense phase conveying systems have been previously utilized. Dense phase conveying systems are characterized by utilizing lower air, or inert gas, velocities and a much higher conveying pressure. The conveying pressure may be as high as 60 psig, and the air, or inert gas, streams travel at velocity typically not exceeding 1200 feet per minute. In contrast to dilute phase conveying systems, dense phase conveying systems utilize higher ratios of particulate material to the amount of air, or inert gas, used. Instead of keeping the particulate material in suspension in the air, or inert gas, stream, the particulate material is pushed, or extruded, through the material conveying pipe in dunes, balls, or "slugs". Since the air, or inert gas, velocity is much lower, the solid particulate material is no longer suspended in the air stream, but falls in the form of strands to the bottom of the material conveying pipe where they are moved through the material conveying pipe by the force exerted upon them by the flowing air, or inert gas, stream, as is well known in the art. When enough particulate material is fed into the material conveying pipe, the dunes and balls formed are moved ahead until the dunes or balls hit each other and form solid plugs, or slugs of particulate material. Since the air, or inert gas, cannot pass through the formed plug, the gas pressure behind the plug pushes, or extrudes, the plug down the material conveying pipe while the next plug, or slug, is being formed. The slugs will be of varying length, depending upon the nature of the particulate product being conveyed, and will typically follow each other along the material conveying pipe with a space in between successive slugs of particulate material.

Because of the high pressures necessary for dense phase conveying systems, the use of ASME code pressure containment vessels, or pressure pots, is required which are typically first filled with the particulate material to be conveyed, as by gravity feeding of the particulate material into the pressure pot. The pressure containment vessel, or pressure pot, must then be sealed, pressurized to the desired high pressure, and after the desired high pressure is achieved, the bottom of the pressure containment vessel would be opened to allow the particulate material to flow out and be forced down the material conveying pipe to its intended destination. The pressure containment vessel would then have to be closed and the pressurized air vented off before the pressure containment vessel can be recharged for the next batch of particulate material to be conveyed. Alternatively, the pressure containment vessel could be returned to the necessary lower pressure for refilling by letting the high pressure air, or inert gas, dissipate down the material conveying line. The foregoing dense phase conveying system is typically referred to as a batch dense phase conveying system.

A disadvantage associated with batch dense phase conveying systems is that there is a significant amount of non-product conveying time involved while the pressure containment vessel is venting, being refilled, and pressurized. Another disadvantage is that, because of the significant amount of non-conveying time, the conveying pipe size must be relatively large to compensate for the lost time. Another disadvantage is that the last portions of the particulate material leaving the pressure containment vessel tend to accelerate rapidly as the material conveying pipe is blown free and the high pressure gas seeks to dissipate down along the material conveying pipe. The increased acceleration of the particulate material being conveyed often causes a significant amount of product degradation to the last portion of the particulate material being conveyed. A further disadvantage results from the high cost of the necessary pressure containment vessel.

Multiple pressure containment vessels have been utilized for continuous dense phase conveying systems, wherein two pressure containment vessels, or pressure pots, are connected to the material conveying pipe. While one vessel is being filled, the other vessel is being discharged into the material conveying pipe. Although this type of continuous dense phase conveying system is somewhat of an improvement over batch dense phase conveying systems, it still suffers from the disadvantages of increased complexity, greater costs, and greater space requirements for the equipment. Additionally, when the desired amount of particulate material has been conveyed, there is still a significant amount of product degradation to the last portion of the particulate material being conveyed, due to the increased velocity of the air, or inert gas, at the end of the last cycle. Another disadvantage is that it is difficult to purge the material conveying pipe clean when two pressure containment vessels are used.

Another prior art dense phase conveying system has utilized a high pressure rotary valve to feed the particulate material into the material conveying pipe, whereby the dense phase conveying system could be operated in a continuous mode that resembles a dilute phase conveying system. A disadvantage associated with this prior art continuous dense phase conveying system is that when conveying is started, the initial high air pressure and high volume of the system causes the particulate material in the material conveying pipe to be conveyed at an undesired high velocity, because of a lack of enough particulate material in the material conveying pipe to form the desired slugs of particulate material in the system. Undesired product degradation results from such high velocity conveyance of the particulate material. Another disadvantage associated with this prior art continuous dense phase conveying system is that, upon reaching proper operating conditions for dense phase conveying, erratic, or other undesired, feeding of the particulate material into the material conveying pipe can cause the conveying system to revert back to the undesired high velocity air, or gas, conveying stream, until desired operating conditions are again reached. An additional disadvantage of such prior art dense phase conveying system is that when the desired quantity of particulate material has been conveyed, the last portion of the particulate material is conveyed at an undesired high velocity and subject to material degradation therefrom. This occurs because after the feeding of the particulate material has ceased, the high pressure air, or inert gas, still flows into the material conveying pipe. A final disadvantage associated with such prior art continuous dense phase conveying system is that if too much particulate material is fed into the material conveying pipe, the material conveying pipe can be completely plugged by the particulate material and the air, or inert gas, pressure within the material conveying pipe rises to an undesired level, whereby it can become necessary to shut down the entire system until the proper pressure conditions can be maintained within the material conveying pipe.

Accordingly, prior to the development of the present invention, there has been no continuous dense phase conveying system and method for conveying a particulate material which: is simple and efficient to manufacture and use; is economical to manufacture and use; does not require an excessive amount of space for the necessary equipment; prevents degradation of the particulate material being conveyed at the time product conveying begins and ends; prevents undesired over-plugging of the material conveying pipe and resulting undesired pressure increases; and prevents degradation of the particulate material being conveyed upon erratic feeding or insufficient feeding of particulate material into the material conveying pipe. Therefore, the art has sought a continuous dense phase conveying system and method for conveying particulate material which: is simple and efficient to manufacture and use; is economical to manufacture and use; does not require extensive space for the necessary equipment; prevents degradation of the particulate material being conveyed at the beginning and end of the conveying cycle; prevents undesired over-plugging of the material conveying pipe and undesired pressure increases within the material conveying pipe; and prevents degradation of the particulate material during erratic feeding or insufficient feeding of the particulate material into the material conveying pipe.

SUMMARY OF THE INVENTION

In accordance with the invention the foregoing advantages have been achieved through the present continuous dense phase conveying system for conveying a particulate material through a material conveying pipe having first and second ends. The present invention includes: a means for feeding the particulate material into the material conveying pipe; means for supplying a gas under high pressure to flow into the material conveying pipe to force the particulate material to move within the material conveying pipe; means for supplying a gas under low pressure to flow into the material conveying pipe to force the particulate material to move within the material conveying pipe; and means for controlling the flow of the high pressure gas and the low pressure gas into the material conveying pipe in response to the gas pressure within the material conveying pipe. Another feature of the present invention may include a means for controlling the particulate material feeding means in response to the pressure within the material conveying pipe.

Another feature of the present invention is that the particulate material feeding means may include an airlock valve, having an inlet and an outlet, the inlet of the airlock valve receiving the particulate material under substantially atmospheric pressure and the outlet of the airlock valve opening into the first end of the material conveying pipe, with the outlet of the airlock valve being exposed to the pressure within the material conveying pipe, which pressure is substantially greater than atmospheric pressure, during normal operation. An additional feature of the present invention is that the airlock valve may be a rotary airlock valve. A further feature of the present invention is that the high pressure gas supply means may include a high pressure gas regulator, a main gas control valve, and a main gas supply line, in fluid communication with each other and the material conveying pipe.

A further feature of the present invention is that the low pressure gas supply means may include a low pressure gas regulator in fluid communication with a low pressure gas supply line, and the low pressure gas regulator and low pressure gas supply line may be in fluid communication with the main gas supply line. Another feature of the present invention is that the flow control means may include a pressure sensor, in fluid communication with the material conveying pipe, for sensing the gas pressure in the material conveying pipe, and the pressure sensor may be connected to the main gas supply line.

In accordance with the invention, the foregoing advantages have also been achieved through the present continuous dense phase conveying method for conveying a particulate material through a material conveying pipe having first and second ends. This aspect of the present invention includes the steps of: feeding the particulate material into the material conveying pipe; supplying a quantity of low pressure gas and permitting the low pressure gas to flow into the material conveying pipe to force the particulate material to move within the material conveying pipe; monitoring the gas pressure within the material conveying pipe; and upon the gas pressure within the material conveying pipe increasing to a first predetermined gas pressure, supplying a quantity of high pressure gas and permitting the high pressure gas to flow into the material conveying pipe to force the particulate material to continuously move within the material conveying pipe, from the first end to the second end of the material conveying pipe, while the material conveying pipe is maintained at a desired material conveying gas pressure.

Another feature of this aspect of the present invention may include the step of ceasing the flow of low pressure gas into the material conveying pipe upon the gas pressure, within the material conveying pipe, increasing to the first predetermined gas pressure. An additional feature of this aspect of the present invention may include the steps of: continuing to monitor the gas pressure within the material conveying pipe; and upon the gas pressure within the material conveying pipe increasing to a second predetermined gas pressure, which is greater than the desired material conveying gas pressure, ceasing the feeding of particulate material into the material conveying pipe. Another feature of the present invention may include the step of: upon the gas pressure within the material conveying pipe decreasing to a third predetermined gas pressure, feeding the particulate material into the material conveying pipe.

A further feature of the present invention may include the step of: upon the gas pressure within the material conveying pipe decreasing to a fourth predetermined gas pressure, which is less than the third predetermined gas pressure, ceasing the flow of the high pressure gas into the material conveying pipe. Another feature of the present invention may include the step of ceasing the flow of low pressure gas into the material conveying pipe upon the gas pressure, within the material conveying pipe, increasing to the first predetermined gas pressure; and upon the gas pressure within the material conveying pipe decreasing to the fourth predetermined gas pressure, permitting the low pressure gas to flow into the material conveying pipe. An additional feature of the present invention may include the step of: upon the gas pressure within the material conveying pipe increasing to a fifth predetermined gas pressure, permitting the high pressure gas to flow into the material conveying pipe. Another feature of the present invention may include the step of: upon the gas pressure within the material conveying pipe increasing to the fifth predetermined gas pressure, ceasing the flow of low pressure gas into the material conveying pipe.

A further feature of the present invention may include the steps of: supplying the quantity of low pressure gas through a low pressure gas supply line in fluid communication with the material conveying pipe; and supplying the quantity of high pressure gas through a high pressure gas supply line in fluid communication with the material conveying pipe. The low pressure gas supply line may have an inlet and an outlet end, and the inlet and outlet ends of the low pressure gas supply line may be connected to the high pressure gas supply line, whereby the low pressure gas supply line is in fluid communication with the material conveying pipe through the high pressure gas supply line.

The continuous dense phase conveying system and method for conveying a particulate material through a material conveying pipe of the present invention, when compared with previously proposed prior art dense phase conveying systems, have the advantages of: being simple and efficient to manufacture and use; being economical to manufacture and use; not requiring an extensive amount of space for the necessary equipment; preventing degradation of the particulate material at the beginning and end of the conveying cycle; preventing undesired over-plugging of the material conveying pipe and undesired, excessive pressure buildup therein; and preventing degradation of the particulate material when erratic or insufficient feed conditions of the particulate material into the material conveying pipe occur.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

Figure 1:
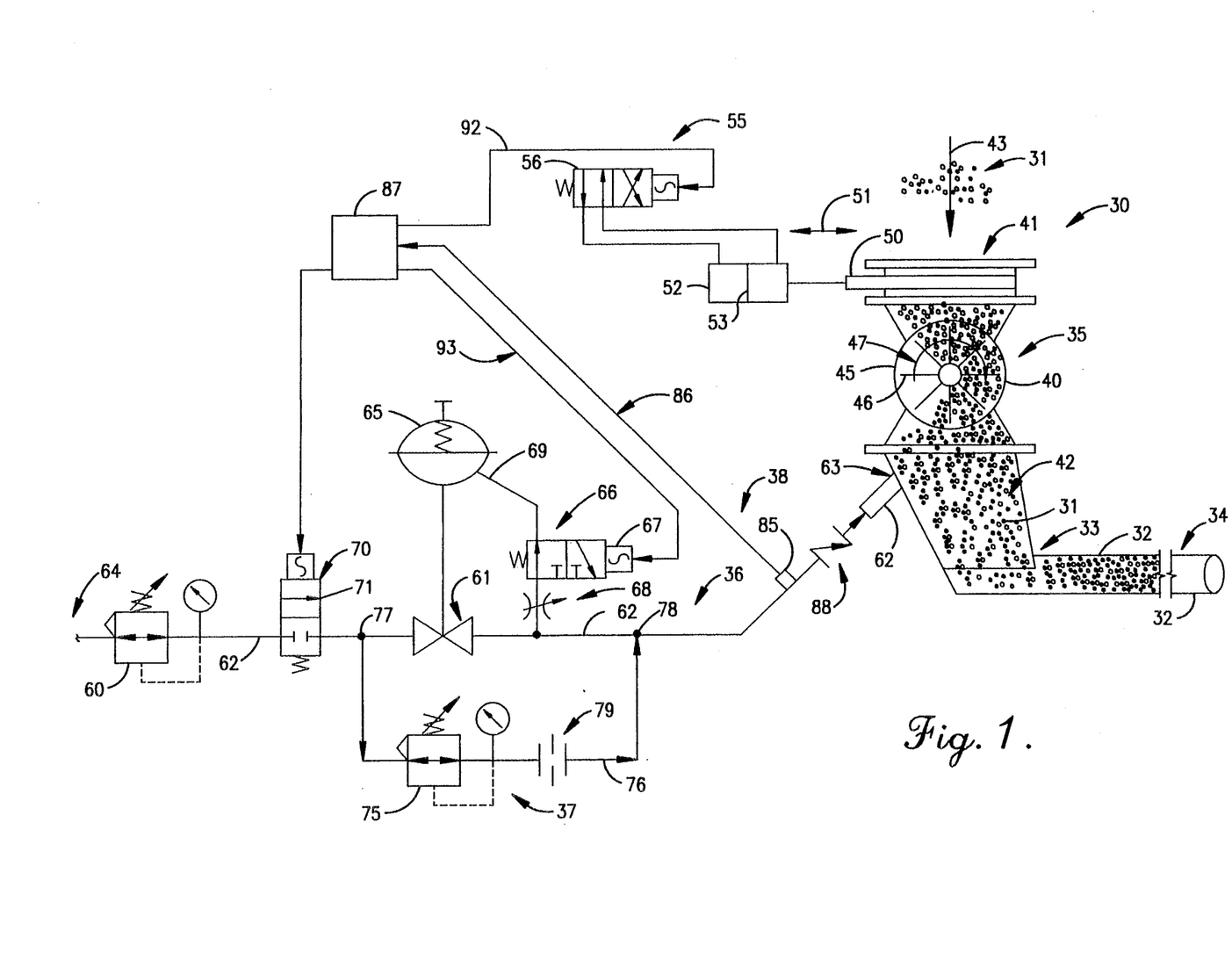
FIG. 1 is a partial cross-sectional view of a portion of the continuous dense phase conveying system of the present invention, and a schematic diagram of another portion of the continuous dense phase conveying system of the present invention.

In FIG. 1, the continuous dense phase conveying system 30 of the present invention for conveying a particulate material 31 through a material conveying pipe 32, having first and second ends 33, 34, generally comprises: a means 35 for feeding the particulate material 31 into the material conveying pipe 32; means 36 for supplying a gas (not shown) under high pressure to flow into the material conveying pipe to force the particulate material 31 to move within the material conveying pipe 32; means 37 for supplying a gas (not shown) under low pressure to flow into the material conveying pipe 32 to force the particulate material 31 to move within the material conveying pipe 32; and means 38 for controlling the flow of the high pressure gas and low pressure gas into the material conveying pipe 32 in response to the gas pressure within the material conveying pipe 32. As previously described, particulate material 31 may be any powder, granular, or pelletized product which is capable of being conveyed by a pneumatic dilute phase or dense phase conveying system. Material conveying pipe 32 may be of standard construction and may have other cross-sectional configurations, other than the circular cross-sectional configuration of the illustrated material 31. Air, or an inert gas, may be utilized as the low pressure and high pressure gases, as is well known in the art.

Still with reference to FIG. 1, the particulate material feeding means 35 may include an airlock valve 40 having an inlet 41 and an outlet 42. The inlet 41 of the airlock valve 40 receives the particulate material 31 under substantially atmospheric pressure, with the particulate material 31 flowing into the inlet 41 of feeding means 35 in the direction of arrow 43. The particulate material 31 which enters inlet 41 of feeding means 35 may come from another feed pipe (not shown), a conventional storage bin, container, hopper, or reservoir (not shown), or any other suitable source as is conventional in the art. The outlet 42 of airlock valve 40 opens into the first end 33 of the material conveying pipe 32, and the outlet 42 of the airlock valve 40 is exposed to the pressure within the material conveying pipe 32, which pressure is substantially greater than atmospheric pressure during normal operation of conveying system 30, as will be hereinafter described in greater detail. Preferably, airlock valve 40 is a rotary airlock valve 45. A suitable rotary airlock valve 45 is that sold by Allied Industries of Houston, Tex., known as the Flo-Tronics Tapered Rotary Airlock. In general, this rotary airlock valve 45 has a plurality of rotor vanes 46 therein which act as a plurality of "revolving doors" for separating one pressurized area, such as the outlet 42, from another non-pressurized area, such as inlet 41. Rotary airlock valve 45 rotates in the direction shown by arrow 47. Feeding means 35 may also include a slide gate valve 50 which is movable in the direction shown by arrows 51 to open or close the inlet 41 of rotary airlock valve 45. A conventional pneumatic or hydraulic cylinder 52 and reciprocating piston 53 may be utilized to provide the necessary movement of slide gate 50 in the direction of arrows 51 as is conventional in the art. A means 55 for controlling the particulate material feeding means 35, or slide gate valve 50, in response to the pressure within the material conveying pipe 32 may be provided and controls the operation of slide gate valve 50, as will be hereinafter described in greater detail. In FIG. 1, slide gate valve 50 is illustrated in its closed position, whereby particulate material 31 may not pass into the inlet 41 of rotary airlock valve 45.

Still with reference to FIG. 1, the high pressure gas supply means 36 preferably includes a high pressure gas regulator 60, a main gas control valve 61, and a main gas supply line 62, in fluid communication with each other and the material conveying pipe 32. Main gas supply line 62 is shown schematically and is a conventional pipe as known in the art, with suitable fittings to permit high pressure gas regulator 60 and main gas control valve 61 to be connected in fluid communication with each other, as well as in fluid communication with material conveying pipe 32 as by connecting main gas supply line 62 to outlet 42 of rotary airlock valve 45 as shown at 63. High pressure gas regulator 60 is provided with gas from a conventional gas supply 64, in fluid communication with main gas supply line 62. High pressure gas regulator 60 may be of conventional construction and is capable of supplying the necessary volume and quantity of pressurized gas, either air or inert gas, into main gas supply line 62. High pressure gas regulator 60 may provide high pressure gas at a pressure up to 75 psig, although as will be hereinafter described in greater detail, a typical pressure for the output of high pressure gas regulator 60 is 45 psig. It should be noted that the foregoing pressure output for high pressure gas regulator 60, as well as the other pressure values to be hereinafter discussed, are arbitrary and selected dependent upon the particular type of particulate material 31 being conveyed by conveying system 30, and the pressure values herein set forth are for illustrative purposes only.

Main gas control valve 61 is preferably a diaphragm operated control valve 65 of conventional construction which includes a diaphragm relief valve 66, which includes a solenoid 67, needle valve 68, and diaphragm pilot line 69. The diaphragm relief valve 66 and needle valve 68 are in fluid communication with the main gas supply line 62 and diaphragm operated control valve 65 via diaphragm pilot line 69. The operation of main gas control valve 61 and its related components will be hereinafter described in greater detail. A main gas valve 70 may be disposed in the main gas supply line 62 between the high pressure gas regulator 60 and the main gas control valve 61. Main gas valve 70 may be of conventional construction, and is preferably a solenoid valve 71. Upon the actuation and closing of main gas valve 70, the supply of high pressure gas from high pressure gas regulator 60 is prevented from passing beyond main gas valve 70 into main gas supply line 62.

Figure 3:
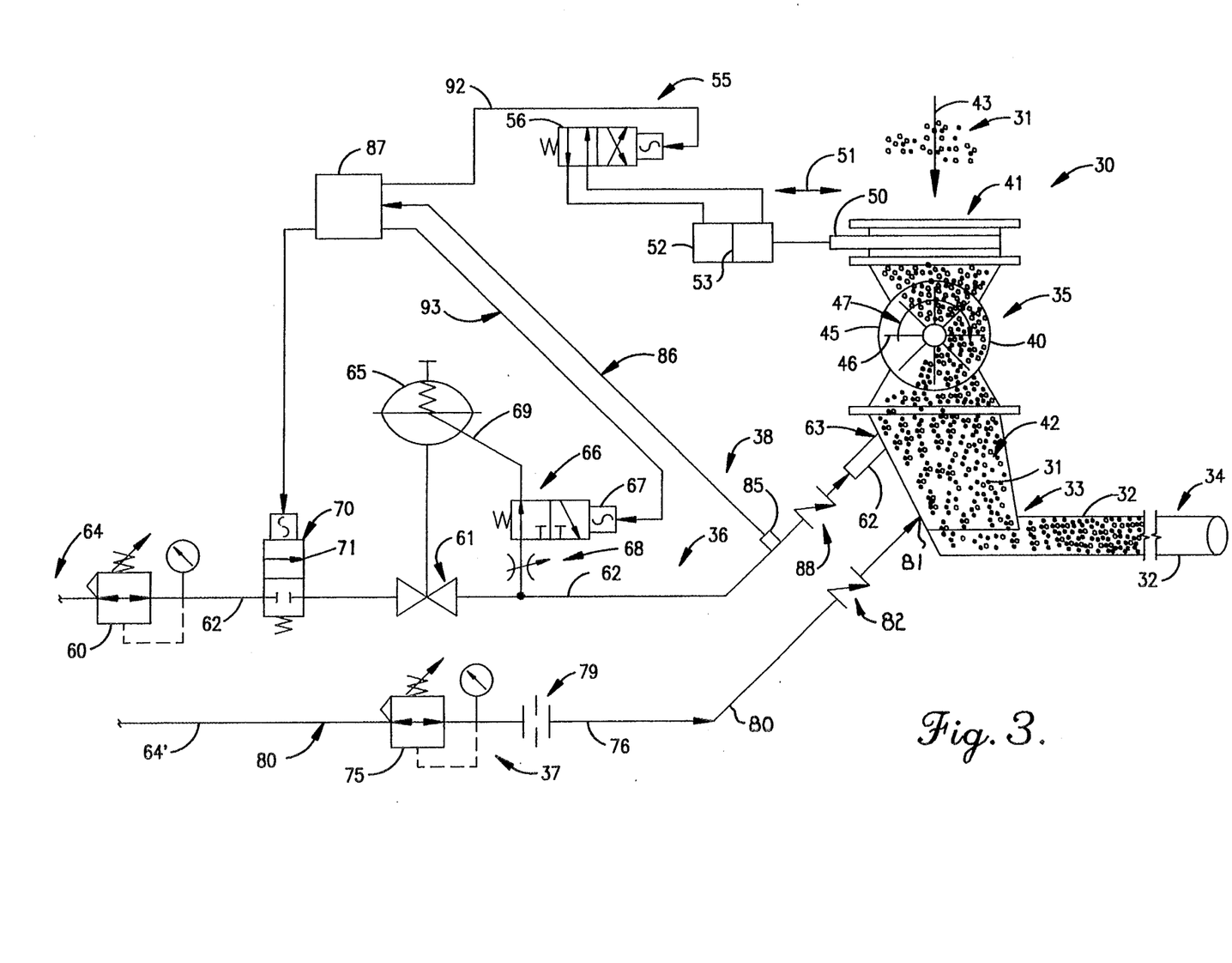
FIG. 3 represents an alternative embodiment of the present invention.

Still with reference to FIG. 1, the low pressure gas supply means 37 preferably includes a low pressure gas regulator 75 disposed in fluid communication with a low pressure gas supply line 76. Low pressure gas supply line 76 is also of conventional piping construction. As illustrated in FIG. 1, the low pressure gas regulator 75 and low pressure gas supply line 76 are in fluid communication with the main gas supply line 62 with its inlet end 77 and outlet end 78 of low pressure gas supply line 76. Low pressure gas supply line 76 is thus disposed in fluid communication with material conveying pipe 32 through its connection at outlet end 78 to main gas supply line 62, which is in fluid communication with material conveying pipe 32 as shown at 63. Low pressure gas supply line 76 thus forms a shunt line, whereby if main gas control valve 61 is closed and main gas valve 70 is open, high pressure gas from high pressure gas regulator 60 will flow into the low pressure gas supply line 76 and into the low pressure gas regulator 75. Low pressure gas regulator 75 supplies a desired quantity and volume of low pressure gas into material conveying pipe 34 via low pressure gas supply line 76 and its connection 78 to main gas supply line 62. A typical pressure setting for low pressure gas regulator 75 would be 25 psig, which may be varied, as previously described, dependent upon the particular particulate material 31 being conveyed by conveying system 30. A volume control device 79 may be disposed within low pressure gas supply line 76 after low pressure gas regulator 75 to control the volume of gas passing through low pressure gas supply line 76. Volume control device 79 may be of conventional construction and may be either a conventional orifice plate or a conventional manual valve. Although low pressure gas supply line 76 is illustrated in FIG. 1 as being a shunt line in fluid communication with material conveying pipe 32 via main gas supply line 62, as previously described, it should be noted that, if desired, low pressure gas supply line 76 could be separate from main gas supply line 62 as illustrated in FIG. 3 by line 80, whereby low pressure gas supply line 80 would be supplied with its own conventional gas supply 64' which would feed into low pressure gas regulator 75 and into material conveying pipe 32 as by a standard connection as shown at 81. A suitable check valve 82 could be disposed in low pressure gas supply line 80 to prevent the flow of high pressure gas into low pressure gas supply line 76, as will be hereinafter described in greater detail.

Still with reference to FIG. 1, flow control means 38 preferably includes a pressure sensor 85 in fluid communication with material conveying pipe 32 for sensing the gas pressure in material conveying pipe 32. Preferably, pressure sensor 85 is disposed in the main gas supply line 62, and the signal 86 from pressure sensor 85 is fed into control module 87, which controls the flow of the high pressure gas and the low pressure gas into the material conveying pipe 32, as will be hereinafter described in greater detail. A check valve 88, of conventional construction, prevents particulate material from flowing into main gas supply line 62, while permitting the gas pressure within material conveying pipe 32 to act upon pressure sensor 85.

With reference to FIG. 1, the continuous dense phase conveying method for conveying a particulate material of the present invention will be described. When dense phase conveying system 30 is initially started: slide gate valve 50 would be in its closed position as illustrated in FIG. 1; main gas valve 70 would be closed; and main gas control valve 61 would also be in its closed position. The particulate material 31 would initially be fed into the material conveying pipe 32 by rotating the rotor vanes 46 of rotary airlock valve 45, and then opening slide gate valve 50 to permit particulate material 31 to flow into rotary airlock valve 45 in the direction of arrow 43. High pressure gas regulator 60 is operated to supply a volume and quantity of high pressure gas from conventional gas supply 64 to main gas supply line 62, at which time main gas valve 70 is opened. Since main gas control valve 61 is closed, the high pressure gas from high pressure gas regulator 60 flows into the low pressure gas supply line 76 and the low pressure gas regulator lowers the pressure of the high pressure gas, which has initially been supplied at 45 psig, to 25 psig. The low pressure gas is then permitted to flow through low pressure gas supply line 76, its volume being controlled by volume control 79, as previously described. The low pressure gas flows from low pressure gas supply line 76 into main gas supply line 62 and into material conveying pipe 32 at location 63. The low pressure gas entering the material conveying pipe 32 begins to push the particulate material 31 slowly into the previously empty material conveying pipe 32, whereby the particulate material 31 is not forced, or pushed, along material conveying pipe 32 at an undesired high velocity to prevent undesired degradation of the particulate material 31 being conveyed.

While the low pressure gas is permitted to flow into the material conveying pipe 32, the gas pressure within the material conveying pipe 32 is monitored by pressure sensor 85, which continuously sends its signal 86, indicative of the gas pressure within material conveying pipe 32, to control module 87. As the material conveying pipe 32 begins to become filled with the particulate material 31 along the length of material conveying pipe 32, the gas pressure within material conveying pipe 32 begins to increase. Upon the gas pressure within the material conveying pipe 32 increasing to a first predetermined gas pressure, a quantity of high pressure gas is supplied to material conveying pipe 32 to force the particulate material 31 to continuously move within the material conveying pipe 32 from its first end 33 to its second end 34, while the material conveying pipe 32 is maintained at a desired material conveying gas pressure. As the gas pressure in the material conveying pipe increases to the first predetermined gas pressure, which for illustrative purposes may be approximately 14 psig, the increased gas pressure also passes through pilot line 69 which causes the diaphragm operated control valve 65 to begin to open main gas control valve 61 to permit the high pressure gas to flow through main gas supply line 62 and into material conveying pipe 32. The high pressure gas, which is also provided at a higher volume rate than the low pressure gas, forces the particulate material 31 to continuously move in a low velocity, dense phase mode through the entire length of the material conveying pipe 32. The gas pressure within the material conveying pipe 32 is continuously monitored by pressure sensor 85 to insure that the material conveying pipe 32 is maintained at the desired material conveying gas pressure, which may be approximately 35–40 psig. After the high pressure gas begins to flow into material conveying pipe 32, the flow of gas through low pressure gas regulator 75 may continue, but the presence of the high pressure gas in main gas supply line 62 prevents the low pressure gas from flowing into the main gas supply line 62. If a separate low pressure gas supply line 80 were to be utilized (as in FIG. 3), the high pressure gas acting upon check valve 82 would prevent the high pressure gas and any particulate material 31 from entering the low pressure gas supply line 80, whereby low pressure gas is not permitted to enter the material conveying pipe 32.

During the operation of conveying system 30, the gas pressure within the material conveying pipe is continuously monitored by pressure sensor 85. Should material conveying pipe 32 approach an undesired plugging condition, due to the feeding of an excessive amount of particulate material 31, or for some other reason, the gas pressure within material conveying pipe 32 will begin to increase to a second predetermined gas pressure, which is greater than the desired material conveying gas pressure of material conveying pipe 32. Should the gas pressure within material conveying pipe increase to this second predetermined gas pressure, which may be approximately 40 psig, the feeding of particulate material 31 into material conveying pipe 32 is ceased. Upon the gas pressure within material conveying pipe 32 increasing to this second predetermined gas pressure, such as 40 psig, a signal 92 is sent from control module 87 to slide gate control valve 56, whereby slide gate 50 is moved to its closed position, as illustrated in FIG. 1, which temporarily stops the feeding of particulate material 31 into material conveying pipe 32.

Since the material conveying pipe 32 is filled with particulate material and the high pressure gas continues to flow into the material conveying pipe 32, because main gas control valve 61 is still open, the particulate material 31 will continue to be conveyed downwardly along the length of material conveying pipe 32, without an undesired total plugging of material conveying pipe 32 occurring. As the high pressure gas forces the particulate material 31 downwardly along the length of material conveying pipe 32, and since no additional particulate material 31 is being fed into material conveying pipe 32, the gas pressure within material conveying pipe 32 will begin to decrease. Upon the gas pressure within the material conveying pipe 32 decreasing to a third predetermined gas pressure, feeding of the particulate material 31 into the material conveying pipe 32 begins again. As the pressure decreases to the third predetermined gas pressure, which for illustrative purposes may be 30 psig, this third predetermined gas pressure is measured by pressure sensor 85, and a signal 92 is sent to slide gate control valve 56. Slide gate valve 50 is then opened to permit particulate material 31 to flow into the inlet 41 of rotary airlock valve 45. Normal feeding of particulate material 31 continues to occur, and the high pressure gas forces the particulate material 31 to continuously move within material conveying pipe 32 in a low velocity dense phase mode.

Should an interruption occur in the feeding of particulate material 31 into material conveying pipe 32, or if an insufficient amount of particulate material is fed into material conveying pipe 32, it is possible that the particulate material 31 in material conveying pipe 32, upon being acted upon by the high pressure gas, will begin to move within material conveying pipe 32 in a high velocity, dilute phase mode, which is undesired. As particulate material 31 begins to approach the undesired high velocity dilute phase mode, the gas pressure within material conveying pipe 32 will begin to decrease. Upon the gas pressure within the material conveying pipe 32 decreasing to a fourth predetermined gas pressure, the flow of the high pressure gas into the material conveying pipe 32 is ceased. For illustrative purposes, the fourth predetermined gas pressure, which is less than the third predetermined gas pressure, may be 25 psig. Upon the gas pressure within material conveying pipe 32 decreasing to the fourth predetermined gas pressure, this lower gas pressure is sensed by pressure sensor 85, and control module 87 sends a signal 93 to main gas control valve 61, which is then closed, whereby low pressure gas from low pressure gas regulator 75 is permitted to flow into the material conveying pipe 32. Signal 93 causes diaphragm relief valve 66 to be operated which vents off diaphragm pressure from diaphragm operated control valve 65, whereby main gas control valve 61 is closed. The low pressure gas thus flows through low pressure gas supply line 76 into main gas supply line 62 and into material conveying pipe 32. The low pressure gas, with its lower volume rate, continues to force the particulate material 31 through material conveying pipe 32, but at a greatly reduced velocity, whereby an undesired high velocity dilute phase mode is prevented from occurring within material conveying pipe 32. If a separate low pressure gas supply line 80 is utilized, check valve 82 would permit the low pressure gas to pass through low pressure gas supply line 80 and into material conveying pipe 32.

As the low pressure gas acts upon the particulate material 31 to force it to move within material conveying pipe 32, material conveying pipe 32 will gradually fill up again with the necessary amount of particulate material 31 to be able to run in a low velocity, dense phase mode. As material conveying pipe 32 fills up with the necessary amount of particulate material 31, the gas pressure within material conveying pipe 32 will begin to increase. Upon the gas pressure within material conveying pipe 32 increasing to a fifth predetermined gas pressure, such as 28 psig, this increased pressure will be sensed by pressure sensor 85 and high pressure gas is then permitted to flow into the material conveying pipe 32. Control module 87 sends a signal 93 to diaphragm relief valve 66 to open main gas control valve 61, and high pressure gas will flow through main gas supply line 62 into material conveying pipe 32. As the gas pressure within the material conveying pipe 32 increases to the fifth predetermined gas pressure, the flow of low pressure gas into the material conveying pipe 32 may cease, as previously described, stopping the flow of low pressure gas from low pressure gas regulator 75.

Upon the high pressure gas flowing into material conveying pipe 32, after the gas pressure within the material conveying pipe 32 has increased to the fifth predetermined gas pressure, conveyance of the particulate material 31 within material conveying pipe 32 will continue in the desired low velocity, dense phase mode. The gas pressure within material conveying pipe 32 is continuously monitored by pressure sensor 85, and should material conveying pipe 32 approach an undesired plugged condition, as previously described, or again encounters an insufficient feeding of particulate material 31 into material conveying pipe 32, as previously described, the foregoing steps will be again carried out to either alter the feeding of the particulate material 31, or to alter the supply of the high pressure gas into material conveying pipe 32, in the manner previously described.

After the desired amount of particulate material to be conveyed along material conveying pipe 32 has entered material conveying pipe 32, slide gate valve 50 is operated to move it into its closed position to prevent the further feeding of particulate material 31 into material conveying pipe 32. Since, as previously described, the gas pressure within material conveying pipe 32 will decrease, the decrease of the gas pressure in the material conveying pipe 32 to the fourth predetermined gas pressure, such as 25 psig, will cause the ceasing of the flow of high pressure gas into material conveying pipe 32. The flow of low pressure gas into material conveying pipe 32 will occur in the manner previously described. Thus, the last portion of particulate material 31 to be conveyed within material conveying pipe 32 will not be conveyed in a high velocity, dilute phase, but will be conveyed with the low pressure, lower volume rate gas from low pressure gas regulator 75, whereby damage and degradation of the last portion of the particulate material 31 to be conveyed will be prevented. After the last remaining portion of the particulate material 31 has been conveyed to the second end 34 of material conveying pipe 32, the gas pressure within material conveying pipe 32 will decrease to a value indicating that the material conveying pipe 32 has been emptied and has been purged of the last remaining portion of particulate material 31. At this point in time, main gas valve 70 would be operated to prevent any further flow of gas into material conveying pipe 32. The conveying system 30 would then be reset to permit the system to again be operated at a later time, in the manner previously described.

The controls of conveying system 30, such as slide gate control valve 56, and diaphragm relief valve 66, may be of any suitable construction and design to perform the desired method steps as previously described. These controls may be either electrically, hydraulically, or pneumatically operated. Preferably, slide gate control valve 56 is a four way, single solenoid control valve. Diaphragm relief valve 66 may be a three-way, normally open, single solenoid control valve. Control module 87 is of conventional design with conventional circuitry to receive the input signal 86 of pressure sensor 85 and then supply the necessary control signals 92–93 as previously described.

Figure 2:
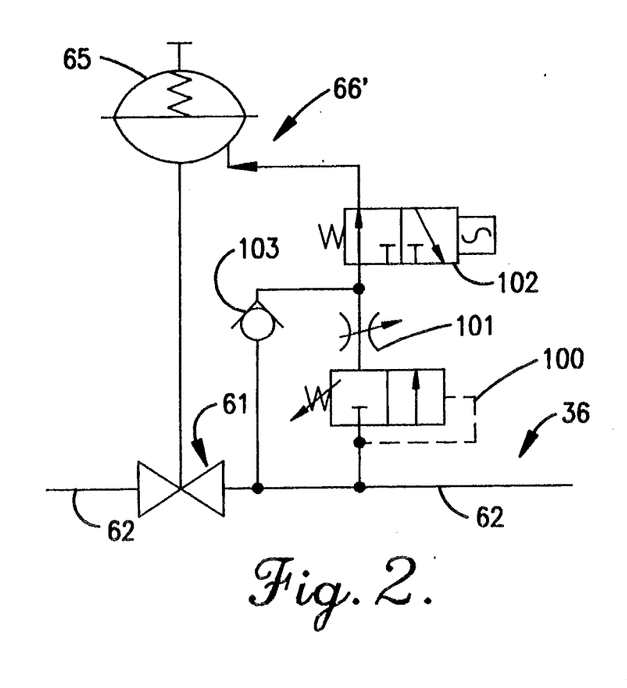
FIG. 2 is a schematic diagram of another embodiment of a portion of the dense phase conveying system of the present invention.

With reference to FIG. 2, another embodiment of diaphragm relief valve 66' is illustrated. This diaphragm relief valve 66' may comprise: an adjustable pressure sensing valve 100; needle valve 101; three-way normally open solenoid valve 102; and check valve 103, all of which are in fluid communication with main gas supply line 62. Adjustable pressure sensing valve 100 sets the pressure at which the diaphragm operated control valve 65 will open. The needle valve 101 retards gas flow to control the speed of the diaphragm operated control valve 65 opening. The three-way, normally open solenoid valve 102 dumps its pressure at a preset descending gas pressure in order to close the diaphragm operated control valve 65 very quickly. The check valve 103 allows modulation of the diaphragm operated control valve 65 to account for slight variations in the gas pressure within the main gas supply line 62.

It is to be understood that the invention is not limited to the exact details of construction, operation, exact materials, or embodiment shown and described, as obvious modifications and equivalents will be apparent to one skilled in the art. For example, controls other than those illustrated and described, could be utilized to operate the feeding means, or to provide the desired flow of either high pressure or low pressure gas. Accordingly, the invention is therefore to be limited only by the scope of the appended claims.

I claim:

1. A continuous dense phase conveying method for conveying a particulate material through a material conveying pipe having first and second ends, the method comprising the steps of:
   (a) feeding the particulate material into the material conveying pipe;
   (b) supplying a quantity of low pressure gas and permitting the low pressure gas to flow into the material conveying pipe to force the particulate material to move within the material conveying pipe;
   (c) monitoring gas pressure within the material conveying pipe; and
   (d) upon the gas pressure within the material conveying pipe increasing to a first predetermined gas pressure, supplying a quantity of high pressure gas and permitting the high pressure gas to flow into the material conveying pipe to force the particulate material to continuously move within the material conveying pipe, from the first end to the second end of the material conveying pipe, while the material conveying pipe is maintained at a desired material conveying gas pressure.

2. The method of claim 1, including the step of ceasing the flow of the low pressure gas into the material conveying pipe upon the gas pressure, within the material conveying pipe, increasing to the first predetermined gas pressure.

3. The method of claim 1, including the step of utilizing air as the low pressure and high pressure gases.

4. The method of claim 1, including the step of utilizing an inert gas as the low pressure and high pressure gases.

5. The method of claim 1, including the steps of: continuing to monitor the gas pressure within the material conveying pipe; and upon the gas pressure within the material conveying pipe increasing to a second predetermined gas pressure, which is greater than the desired material conveying gas pressure, ceasing the feeding of the particulate material into the material conveying pipe.

6. The method of claim 5, including the step of: upon the gas pressure within the material conveying pipe decreasing to a third predetermined gas pressure, feeding the particulate material into the material conveying pipe.

7. The method of claim 6, including the step of: upon the gas pressure within the material conveying pipe decreasing to a fourth predetermined gas pressure, which is less than the third predetermined gas pressure, ceasing the flow of the high pressure gas into the material conveying pipe.

8. The method of claim 7, including the steps of: ceasing the flow of the low pressure gas into the material conveying pipe upon the gas pressure, within the material conveying pipe, increasing to the first predetermined gas pressure; and upon the gas pressure within the material conveying pipe decreasing to the fourth predetermined gas pressure, permitting the low pressure gas to flow into the material conveying pipe.

9. The method of claim 8, including the step of: upon the gas pressure within the material conveying pipe increasing to a fifth predetermined gas pressure, permitting the high pressure gas to flow into the material conveying pipe.

10. The method of claim 9, including the step of: upon the gas pressure within the material conveying pipe increasing to the fifth predetermined gas pressure, ceasing the flow of the low pressure gas into the material conveying pipe.

11. The method of claim 1, including the steps of utilizing an airlock valve, having an inlet and an outlet, to feed the particulate material into the material conveying pipe; disposing the inlet to receive the particulate material under substantially atmospheric pressure; and disposing the outlet to feed the particulate material into the first end of the material conveying pipe.

12. The method of claim 11, including the step of utilizing a rotary airlock valve as the airlock valve.

13. The method of claim 1, including the steps of: supplying the quantity of the low pressure gas through a low pressure gas supply line in fluid communication with the material conveying pipe; and supplying the quantity of the high pressure gas through a high pressure gas supply line in fluid communication with the material conveying pipe.

14. The method of claim 13, wherein the low pressure gas supply line has inlet and outlet ends, including the step of connecting the inlet and outlet ends of the low pressure gas supply line to the high pressure gas supply line, whereby the low pressure gas supply line is in fluid communication with the material conveying pipe through the high pressure gas supply line.

15. The method of claim 13, including the step of monitoring the gas pressure within the material conveying pipe by utilizing a pressure sensor in fluid communication with the material conveying pipe.

16. The method of claim 15, including the step of disposing the pressure sensor in fluid communication with the high pressure gas supply line.

* * * * *